W. G. TEMPLETON.
SCALE.
APPLICATION FILED MAR. 22, 1913.
1,255,351.
Patented Feb. 5, 1918.
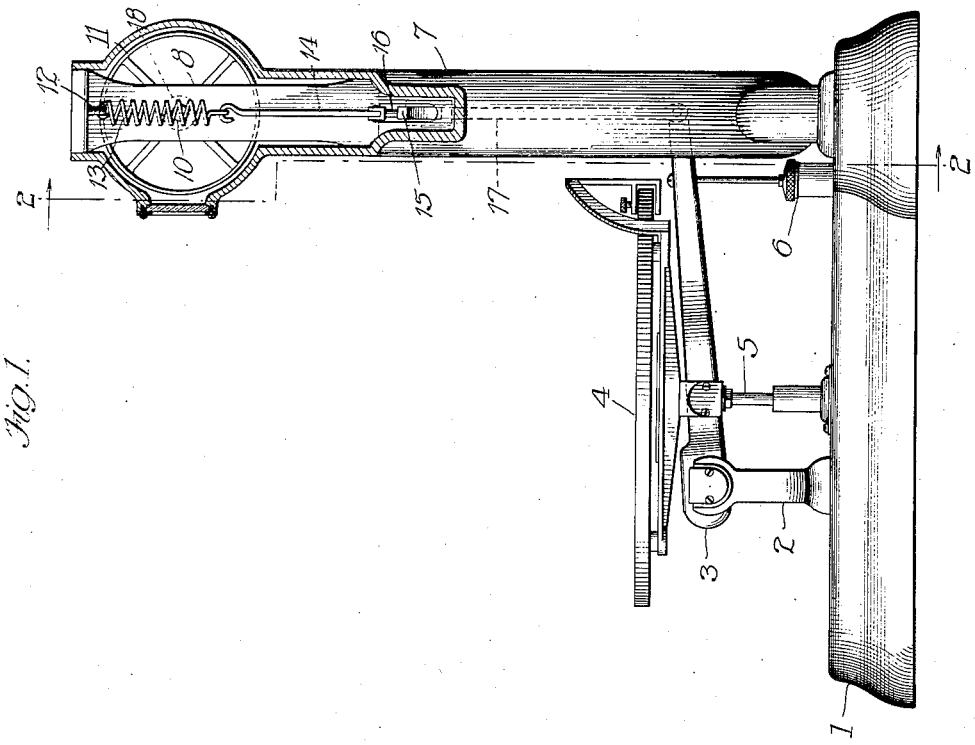
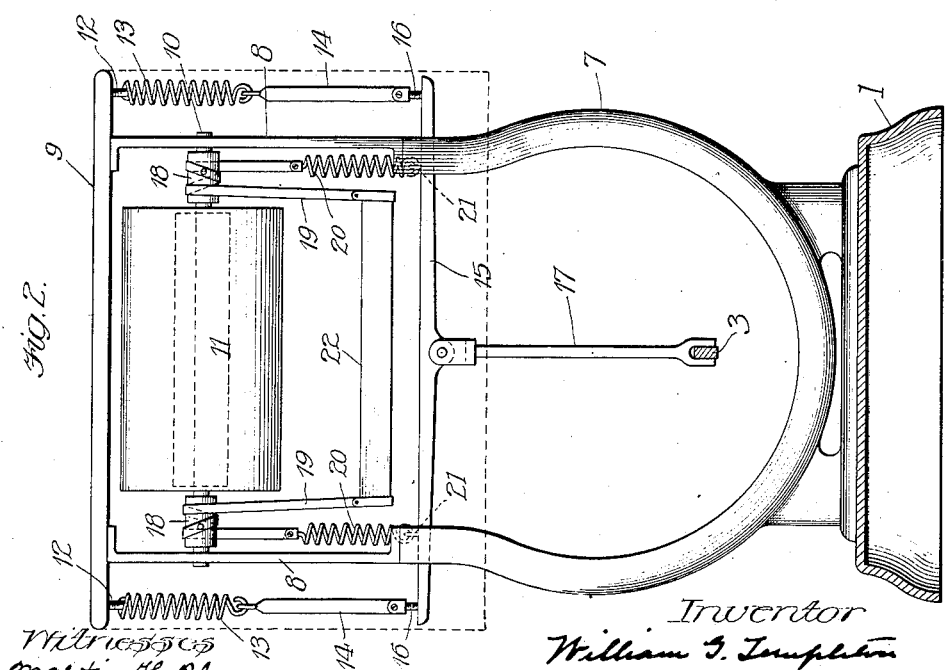
Witnesses
Martin H. Olsen.
Robert Dobberman
Inventor
William G. Templeton
By Attys

UNITED STATES PATENT OFFICE.

WILLIAM G. TEMPLETON, OF COLORADO SPRINGS, COLORADO, ASSIGNOR, BY MESNE ASSIGNMENTS, TO TOLEDO SCALE COMPANY, OF TOLEDO, OHIO, A CORPORATION OF NEW JERSEY.

SCALE.

1,255,351.      Specification of Letters Patent.      Patented Feb. 5, 1918.

Application filed March 22, 1913. Serial No. 756,205.

*To all whom it may concern:*

Be it known that I, WILLIAM G. TEMPLETON, a citizen of the United States, residing at Colorado Springs, county of El Paso, and State of Colorado, have invented certain new and useful Improvements in Scales, of which the following is a specification.

My invention relates more particularly to spring scales and in the accompanying drawings and the following detailed description I have disclosed it in connection with a beam scale of ordinary construction, though it will be apparent that the invention is not limited to scales of that type, but is equally applicable to suspended and other scales. While I have disclosed a specific form of device embodying my invention, it is to be understood that I have done so for the purposes of exemplification only and that not only is my invention applicable to other types of scales, but it may be modified in many particulars, the scope of the invention being set forth in the following claims, in which I have endeavored to distinguish it from the prior art, so far as known to me, without, however, relinquishing or abandoning any part thereof.

In the accompanying drawings Figure 1 is a side elevation, partly in section, of the specific form of scale referred to above, and Fig. 2, a section perpendicular to the plane of Fig. 1 and on the line 2—2 thereof, the casing being indicated in dotted lines.

In the particular example of my invention shown the scale base 1, carries the horn or fulcrum 2, on which is pivoted the beam 3 and the latter carries the scale pan 4, provided with the check 5 for maintaining it in horizontal position, a dash-pot 6 being attached to the beam for the usual purpose of preventing undue oscillation thereof. The upright frame 7 is also supported upon the base and, as shown, is horseshoe or U-shaped, the branches or ends thereof being extended by uprights 8—8 which are connected at their upper ends to a top piece 9, and in which are openings constituting bearings for the shaft 10 of a rotary chart 11. At its opposite ends the top piece 9 is provided with eyes 12—12, to which the upper ends of springs 13—13 are secured, while the lower ends of the said springs are connected by straps 14—14 with a cross bar 15, the connection being adjustable, as seen at 16—16. Intermediate the ends of the cross bar 15 is pivoted a link 17 which at its lower end is bifurcated and embraces and is secured to the end of the beam 3. Upon the journal 10 of the rotary chart 11, and at opposite ends thereof but within the uprights 8—8, are secured the members of a pair of drums 18—18, and a pair of straps 19—19 are wound upon and secured to the drums 18—18 respectively, one end of each strap being secured to a spring 20—20 which in turn is attached at its lower end to an eye 21—21 upon the cross bar 15, and the other end of each strap is attached to a counterweight 22. It will be readily seen that when a weight is put upon the scale pan 4, it depresses the lever 3, drawing down the bar 15 against the tension of the springs 13—13. The depression of the bar 15 however, exercises a downward tension upon the springs 20—20 which causes them to revolve their drums 18—18 and the rotary chart, and at the same time elevates the weight 22. Preferably the weight 22 is so gaged or selected as to half counterbalance the pull of the lever and connected parts upon the bar 15. This being the case, the springs 20—20 support half the load of the bar 15, link 17, and scale beam and associated parts, while the remainder of the weight is evenly distributed between the springs 13—13. It follows that the entire weight of the scale is divided evenly between the springs 13—13 and 20—20.

It is a serious defect of scales employing springs for counterbalancing the weight of the commodity or article being weighed, that the springs are susceptible to changes in temperature, lengthening when the temperature rises and shortening when the temperature falls. As a result of these variations in the springs, the indicator is shifted from its correct position. With the present invention, however, it will be noted that the springs 20—20, which, when the scale is empty, are under substantially the same load and other conditions as the springs 13—13, expand with them and to the same extent, so that they automatically correct any displacement of the zero position due to the expansion and contraction of the springs 13—13.

I claim:

1. A scale comprising a load receiver, a spring for off-setting or counterbalancing the load on the scale, an indicator for indicating the weight of the load, and a spring connection between the weight off-setting spring and the indicator, having substantially the same expansion under equal changes of temperature as the first said spring and so connected that by its expansion and contraction it compensates for the expansion and contraction of the load off-setting spring.

2. In a weighing scale and in combination with the beam, platform, and indicator, an equalizer bar 15, connected to the beam, a pair of load off-setting springs connected to the equalizer bar, a rotary chart indicator, and a pair of springs having substantially the same expansion under equal changes of temperature as the first said springs, intermediate the equalizer bar and said indicator.

3. In a weighing scale, and in combination with the frame and goods receiver thereof, a spring intermediate the frame and goods receiver for off-setting the load of the latter, an indicator, and a spring connected intermediate the goods receiver and the indicator having substantially the same expansion under equal changes of temperature as the first said spring for the correction of the expansion and contraction of the load off-setting spring.

4. In a weighing scale, a frame, a goods receiver, a pair of load off-setting springs intermediate the frame and goods receiver, a weight-indicator, and a pair of springs having substantially the same expansion under equal changes of temperature as the first said spring intermediate the same and the load receiver, and adapted to operate the former from the latter.

5. In a weighing scale, a frame, a goods receiver, a spring for off-setting the load on the receiver, a weight indicator, a connection between the load receiver and the weight indicator, comprising a spring having substantially the same expansion under equal changes of temperature as the first said spring.

6. In a weighing scale, and in combination with the frame and goods receiver thereof, a load off-setting spring between the frame and the goods receiver, a rotary weight indicator mounted in the frame, and a spring having substantially the same expansion under equal changes of temperature as the first said spring intermediate the said indicator and load receiver, and connected to it for operating the indicator in accordance with the weight in the load receiver.

7. In a weighing scale and in combination with the frame and load receiver thereof, a rotary indicator mounted in the frame, a pair of drums secured to the shaft of the indicator, a pair of ribbons, each secured intermediate its ends to one of the drums, a pair of springs each connected at one end to one of said ribbons and at the other end to the load receiver, and a weight connected to the other ends of said ribbons.

8. In a weighing scale, and in combination with the frame and load receiver thereof, an equalizing bar 15, connected to the load receiver, means connected to the equalizer bar for off-setting the weight of the load, a rotary indicator journaled in the frame, a pair of drums mounted respectively at the opposite ends of the indicator, a ribbon wound upon each drum and connected at one end to a spring, the other end of which is connected to the equalizer bar, and a weight secured to the other end of said ribbons.

9. In a weighing scale and in combination with the frame and load receiver thereof, an equalizer bar connected to the load receiver, a spring means connecting the said bar and frame for off-setting the weight of the load, a rotary indicator mounted in the frame drums mounted upon the opposite ends of the indicator shaft, a ribbon wound and connected intermediate its ends on each drum, a counterweight to which one end of each ribbon is secured, and a spring between the opposite end of each ribbon and the equalizer bar.

10. In a weighing scale and in combination with the frame and load receiver thereof, an equalizer bar 15 connected to the load receiver, a pair of load off-setting springs 13—13, connected to the equalizer bar and to the frame, a rotary indicator journaled in the frame, winding drums mounted on the shaft of the indicator at the opposite ends thereof, a ribbon secured to each drum intermediate its ends and wound thereon, a weight connected to one end of each said ribbon, and a spring connected to the other end of each ribbon and to the equalizer bar.

11. In a weighing scale, and in combination with the frame and load receiver thereof, a load off-setting spring intermediate the frame and load receiver, a rotary indicator, a drum on the shaft of the rotary indicator, a spring substantially identical with the first said spring connected at one end to the load receiver, and a ribbon connected at one end to and partially wound upon the drum and connected at its other end to the second said spring.

12. In a weighing scale, and in combination with the frame and load receiver thereof, a load off-setting spring intermediate said frame and load receiver, a weight indicator, and a second spring substantially identical with the first said spring and having the same expansion for equal temperature changes and interposed in the connections between the indicator and load receiver.

13. In a weighing scale and in combination with the frame and load receiver thereof, an equalizer bar 15 connected to the load receiver, a pair of springs 13, connected to the opposite ends of the equalizer bar and to said frame, a rotary indicator journaled in the frame, a pair of drums mounted respectively on the opposite ends of the indicator shaft, a pair of ribbons each secured to one of said drums, a counterweight 22, secured to one end of each of said ribbons, and a pair of springs 20, substantially identical with the first mentioned pair of springs and each connected to one of said ribbons and to the equalizer bar.

14. In a weighing scale, a goods-receiver, mechanism for connecting the goods-receiver with the load-offsetting means, load-offsetting means arranged to normally support a portion only of the weight of the goods-receiver and connecting mechanism, a vertically-movable weight for normally supporting the remainder of the weight of said members, a rotary indicator, and means secured to said weight and connecting mechanism for operating the rotary indicator.

15. In a weighing scale, a goods-receiver, mechanism for connecting the goods-receiver with the load-offsetting means, load-offsetting means comprising a spring arranged to normally support a portion only of the weight of the goods-receiver and connecting mechanism, a vertically-movable weight for normally supporting the remainder of the weight of said members, a rotary indicator, and means secured to said weight and connecting mechanism for operating the rotary indicator, said last-named means including a spring.

16. In a weighing scale, a goods-receiver, mechanism for connecting the goods-receiver with the load-offsetting means, load-offsetting means comprising a spring arranged to normally support substantially half the weight of the goods-receiver and connecting mechanism, a vertically-movable weight arranged to normally support the remainder of the weight of said members, a rotary indicator, a strap secured to the shaft of said indicator and to said weight, and a spring arranged between the strap and the goods-receiver.

WILLIAM G. TEMPLETON.

Witnesses:
J. W. MATTHEWS,
F. O. VALENTINE.